(12) United States Patent
Bidare

(10) Patent No.: US 8,407,762 B2
(45) Date of Patent: Mar. 26, 2013

(54) SYSTEM FOR THREE LEVEL AUTHENTICATION OF A USER

(75) Inventor: Prasanna Bidare, Bangalore (IN)

(73) Assignee: Tata Consultancy Services Ltd., Mumbai (IN)

( * ) Notice: Subject to any disclaimer, the term of this patent is extended or adjusted under 35 U.S.C. 154(b) by 76 days.

(21) Appl. No.: 12/915,968

(22) Filed: Oct. 29, 2010

(65) Prior Publication Data

US 2012/0005735 A1   Jan. 5, 2012

(30) Foreign Application Priority Data

Jul. 1, 2010  (IN) .......................... 1925/MUM/2010

(51) Int. Cl.
*H04L 9/32* (2006.01)
(52) U.S. Cl. ............................................... 726/2; 726/7
(58) Field of Classification Search ........................ 726/7
See application file for complete search history.

(56) References Cited

U.S. PATENT DOCUMENTS

| | | | |
|---|---|---|---|
| 5,559,961 A | | 9/1996 | Blonder |
| 5,898,779 A | * | 4/1999 | Squilla et al. ................. 713/176 |
| 2004/0010721 A1 | * | 1/2004 | Kirovski et al. ............... 713/202 |
| 2004/0093527 A1 | * | 5/2004 | Pering et al. ................... 713/202 |
| 2004/0230843 A1 | * | 11/2004 | Jansen ........................... 713/202 |
| 2007/0094717 A1 | * | 4/2007 | Srinivasan et al. ................. 726/5 |
| 2009/0199295 A1 | * | 8/2009 | Shih et al. ........................ 726/18 |
| 2010/0070759 A1 | | 3/2010 | Leon et al. |
| 2012/0023574 A1 | * | 1/2012 | Osborn et al. .................. 726/19 |

* cited by examiner

*Primary Examiner* — Matthew Smithers
(74) *Attorney, Agent, or Firm* — Robert Plotkin, P.C.

(57) ABSTRACT

A system and method for three level authentication of a user has been disclosed. The system 100 performs three level authentication: first level being selection of at least one predefined image from a plurality of images including decoy images; second level being selection of at least one predefined tile in the tiled version of the selected images to generate a transaction key; and the third level being entering a transaction key generated after first and second level are successfully completed, which is used for final account login and grant of transaction rights. The authentication is done on user's computing node 110 by communicating with authentication server 102 for first and second level authentication and the transaction key for third level authentication being generated by transaction key generating server 124 and transmitted on to user's computing node.

13 Claims, 4 Drawing Sheets

SYSTEM FOR THREE LEVEL AUTHENTICATION OF A USER

CROSS-REFERENCE TO RELATED APPLICATIONS

This application claims priority under 35 U.S.C. §119 from Indian Patent Application Serial Number 1925/MUM/2010, filed Jul. 1, 2010.

FIELD OF THE INVENTION

The present invention relates to the field of information technology. Particularly, the invention relates to the field of information security.

DEFINITIONS

In this specification, the following terms have the following definitions as given alongside. These are additions to the usual definitions expressed in the art.

First Level Authentication Challenge—Formation of an authentication form which includes different images including decoy images and password image.

Second Level Authentication Challenge—Formation of an authentication form showing tiled version of image.

Transaction Key—The code or the number to be entered for grant of access and grant of transaction rights.

BACKGROUND OF THE INVENTION

Internet banking, online flight booking, online railway reservations, stock/shares sale/purchase, online shopping and online bill payment are some of the instances of today's trend of online transactions which have given users tremendous flexibility and ease of operation.

However, this has also raised issues like increase in hacking and banking frauds by illegal people accessing user's account. Albeit, BFI's and enterprises do appreciate the ubiquity, scalability and cost effectiveness in Net transaction, but beaten by equal number of intruders hacking the system.

Several systems and processes have been used in the past and also are in operation currently for preventing online frauds and granting secure access to users including:
- PIN verification—Pin verification includes a secret pin number entered by users and used for authentication;
- Challenge response questions—User is challenged with questions pre-fed to him/her to grant access; and
- Biometric authentication—Bio-metric authentication includes fingerprint recognition, iris recognition and speech/voice recognition for granting access.

But all of the above systems are pre existing for long time and hackers have found a work around, or other systems are costly, complex. To sight an example, the user name and Pin is easy to break and not sufficient for current internet authentications. And also a client needs to remember multiple of those which poses difficulty or alternately, in case biometric systems complex image and complex signal processing is involved which creates scaling and manageability at server side.

Moreover, the biometric systems are not easily affordable (not just the cost but even use and operability) by individual users. And in case the Bio print is hacked, then user loses his/her bio identity.

Several systems have been implemented in the past for graphical authentication like United States Patent Application 20040010721 which discloses a method and system for authentication of a user. Disclosed method includes operation which tiles an image, associates an index with each tile and optionally determines offsets for select tiles. Further, the tiling optionally relies on probability and/or entropy. Password identification relies on one or more indices and one or more offsets. However, authentication based on the entropy and/or probability includes in efficient and complex process. Also, only one level of authentication does not provide very strong degree of protection.

Hence, there was felt a need for a system which is
easily operable;
easily deployable;
efficient and reliable;
able to provide multilevel security; and
cost effective.

OBJECTS OF THE INVENTION

It is an object of the present invention to provide an easily operable authentication system.

It is another object of the present invention to provide an easily deployable authentication system.

It is still another object of the present invention to provide efficient and reliable authentication system.

It is still another object of the present invention to provide a system for authentication which is able to provide multilevel security checks.

It is still another object of the present invention to provide a time effective system for authentication.

It is yet another object of the present invention to provide a space effective system for authentication.

Further, an object of the present invention is to provide a cost effective system for authentication.

SUMMARY OF THE INVENTION

The present invention envisages a system for authenticating a user, the system performing three level authentications on the basis of selection of at least one predefined image from a plurality of images including decoy images and further selection of at least one predefined tile in the tiled version of the selected images to generate a transaction key, the system comprising:
an authentication server comprising
an authentication repository storing user authentication data including at least one password image serving as correct response for a first level authentication challenge, tiled version of password image and at least one password tile serving as correct response for second level authentication challenge;
first authentication challenge generation means adapted to generate a first level authentication challenge for the user by formulating a group of images including a plurality of decoy images and the at least one password image to be displayed on user's computing node;
transmitting means adapted to transmit said first level authentication challenge, at least one password image, tiled version of password image and at least one password tile on to a user's computing node;
user's computing node receiving said first level authentication challenge, at least one password image, tiled version of password image and at least one password tile, said user's computing node including:
displaying means adapted to display the group of images contained in said received first level authentication challenge;

first selection means adapted to allow the user to select at least one image from the plurality of images displayed on the computing node;

second authentication challenge generation means adapted to generate second level authentication challenge by displaying the tiled version of the password image containing a plurality of tiles in case the selected image is the password image;

frame locomotion means adapted to provide an outlining frame randomly moving across each of the plurality of tiles after a finite delay;

second selection means adapted to allow the user to select at least one tile currently outlined by said outlining frame from the plurality of tiles displayed on the computing node; and authenticating message generation means adapted to generate authenticating message in case the selected tile is the password tile and transmit said authenticating message to a transaction key generating server;

a transaction key generating server cooperating with said user's computing node and configured to transmit a transaction key to said user's computer node on receiving an authenticating message from said authentication message generation means, said transaction key to be used for final account login and grant of transaction rights.

Typically, the second challenge generation means includes first sequence checking means adapted to check the sequence of selection of images, selected in the previous stage in case of multiple password images serving as correct response for first level authentication challenge.

Typically, the authenticating message generation means includes second sequence checking means adapted to check the sequence of selection of tiles, selected in the previous stage in case of multiple password images serving as correct response for second level authentication challenge.

Typically, computing node is selected from the group consisting of mobile phone, PDA, iPOD, iPAD, computer, laptop, and TV.

Preferably, the transaction key is entered on a second computing means;

Typically, the transmitting means transmits the first level authentication challenge and tiled version of password image on to a user's computing node using connection selected from the group consisting of GSM connection, CDMA connection, internet, GPRS, Bluetooth, RFID and EDGE.

Typically, the system includes conventional authentication means adapted to challenge user to enter correct alphanumeric username and password to continue authentication.

Typically, the authentication repository is populated during user registration phase.

In accordance with another embodiment of the present invention a method for authenticating a user is envisaged, the method performing three level authentication on the basis of selection of at least one predefined image from a plurality of images including decoy images and further selection of at least one predefined tile in the tiled version of the selected images to generate a transaction key, the method comprising the steps of storing user authentication data including at least one password image serving as correct response for a first level authentication challenge, tiled version of password image and at least one password tile serving as correct response for second level authentication challenge;

generating a first level authentication challenge for the user by formulating a group of images including a plurality of decoy images and the at least one password image to be displayed on user's computing node;

transmitting first level authentication challenge, at least one password image, tiled version of password image and at least one password tile on to a user's computing node;

receiving said first level authentication challenge, at least one password image, tiled version of password image and at least one password tile displaying the group of images contained in said received first level authentication challenge;

selecting at least one image from the plurality of images displayed on the computing node;

generating second level authentication challenge by displaying the tiled version of the password image containing a plurality of tiles in case the selected image is the password image;

providing an outlining frame randomly moving across each of the plurality of tiles after a finite delay;

selecting at least one tile currently outlined by said outlining frame from the plurality of tiles displayed on the computing node;

generating authenticating message in case the selected tile is the password tile and transmitting said authenticating message to a transaction key generating server; and transmitting a transaction key to the user's computing node on receiving an authenticating message, using said transaction key for final account login and grant of transaction rights.

Typically, the method includes the step of challenging the user to enter correct alphanumeric username and password to continue authentication.

Typically, the step of storing user authentication data in the authentication repository is performed during user registration phase.

Typically, the step of selecting at least one image from the plurality of images displayed on the computing node includes the step of checking the sequence of selection of images, selected in the previous stage in case of multiple password images serving as correct response for first level authentication challenge.

Typically, the step of generating authenticating message in case the selected tile is the password tile includes the step of checking the sequence of selection of tiles, selected in the previous stage in case of multiple password tiles serving as correct response for second level authentication challenge.

BRIEF DESCRIPTION OF THE ACCOMPANYING DRAWINGS

The invention will now be described with reference to the accompanying drawings, in which.

DESCRIPTION OF THE INVENTION

The invention will now be described with reference to the accompanying drawings which do not limit the scope and ambit of the invention. The description provided is purely by way of example and illustration.

The systems currently available in market are not easy to deploy and some of them also require users to remember complex codes and in cases where users do communicate on Internet for various kinds of online transactions, remembering codes for each one becomes even worst. Hence, the present invention provides a solution to all the above stated problems by providing a system which rather than using codes uses images which once seen are easy to remember.

The present invention envisages a system for online authentication which provides three level security checks to ensure only genuine users can access confidential/privileged information and transact online.

According to an aspect of the invention the authentication will be done in three levels or three tiers. At the first level the user will be provided multiple images for selection on his/her computing node, for instance the user's computing node can be mobile phone, PDA, iPOD, iPAD, laptop, computer and the like. At this level the user will be required to select one or multiple images which he/she has predefined during the registration phase to be the correct password images for this level authentication.

After the first level of authentication is successfully done the user will be confronted to second level authentication, where the image selected at the previous level will be shown in a tiled format and the user will be required to select one or multiple tiles which he/she has predefined during the registration phase to be the correct password tile for this level of authentication.

After the second level authentication is successfully done the user will be provided a transaction key or code which he/she needs to enter as the password at the third level of authentication in order to get completely authenticated and to get transaction rights. These transactions rights can be for bank transactions, reading emails, blogging, social networking, shairing media and the like depending upon the implementation of system in that particular environment or application.

Other aspects of the invention will become apparent by consideration of the accompanying drawings and their description stated below, which is merely illustrative of a preferred embodiment of the invention and does not limit in any way the nature and scope of the invention.

Figure 1:
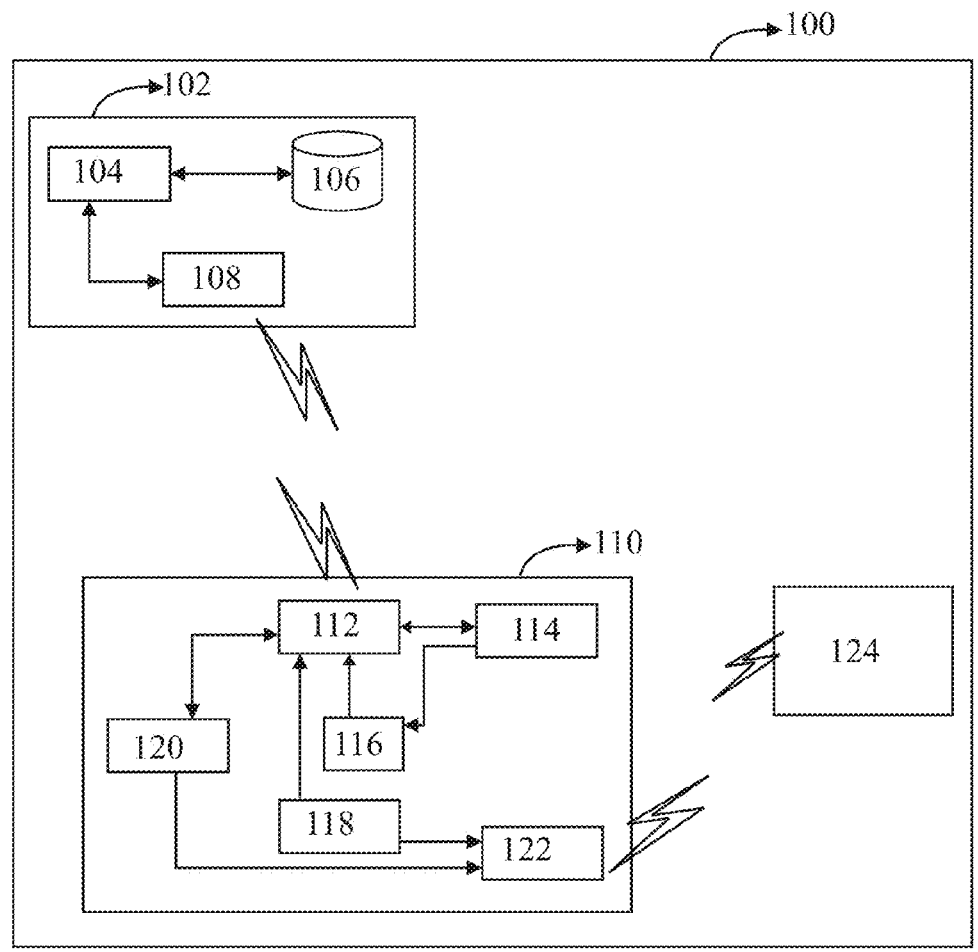
FIG. 1 illustrates a block diagram of the system for authentication of a user, in accordance with the present invention.

Referring to FIG. 1, there is shown a schematic of the system authenticating a user represented by numeral 100, which includes an authentication server 102 which stores the authentication data of users in an authentication repository 106, this authentication data includes general authentication data, for instance users name, date of birth, email id, phone no, and the like and the system specific authentication data i.e. images provided by the user for authentication at the first level, tiled version of the user provided images, specific tiles on the images for authentication at the second level. The user authentication repository is populated during the user registration phase.

Further, the authentication server 102 includes a first authentication challenge generation means 104 which generates a first level authentication challenge for the user by formulating a group of images including a plurality of decoy images and the password image(s) to be displayed on user's computing node; this challenge is transmitted to the user's computing node using a transmitting means 108. Also, the password images, tiled version of password images and password tiles are transmitted using the transmitting means 108 on to a user's computing node 110. The transmission can be done using GSM connection, CDMA connection, internet, GPRS, Bluetooth, RFID, EDGE and the like.

Further at the user's computing node 110 first level authentication challenge, password image(s), tiled version of password image(S) and password tiles are received and displayed using displaying means 112. During first level authentication challenge the displaying means 112 display the group of images contained in the first level authentication challenge generated using first authentication generation means 104. The user over here is required to select the image(s) as password for this level of authentication from the images displayed on the computing node using first selection means 114.

If the selected image(s) matches the password image(s) transmitted along with first level authentication challenge then second challenge generation means 116 generates second level authentication challenge by displaying the tiled version of the password image containing multiple tiles. A frame locomotion means 118 is provided to provide an outlining frame randomly moving across each of the displayed tiles after a finite delay. This delay is essentially provided to allow the user to select the tile using second selection means 120 which can be for instance select button or a stylus. The second selection means 120 allows the user to select at least one tile currently outlined by the outlining frame from the tiles displayed on the computing node. Authenticating message generation means 122 generates an authenticating message in case the selected tile(s) is the correct password tile and transmits the authenticating message to a transaction key generating server 124 which provides transaction key by transmitting it to the user's computing node 110 on receiving an authenticating message, this transaction key serves as password for third level authentication to be used for final account login and grant of transaction rights.

It is within the scope of the invention to use the transaction key for complete log in or sign in and grant of transaction rights on user's computing node on which authentication occurred or on the any other computing node which might or might not be connected the user's computing node on which authentication occurred.

In case of multiple image selection for clearing first level authentication challenge and multiple tile selection for clearing second level authentication challenge even sequence of selection is taken into consideration as a parameter for successful authentication of the user. The sequence of selection multiple images in the first level of authentication is checked using first sequence checking means (not shown in the figure), and the sequence of selection of tiles in the second level authentication is checked using second sequence checking means (not shown in the figure).

It is within the scope of invention to introduce even stronger protection scheme in case of most critical protection the system can be used along with conventional authentication systems which perform authentication based on biometrics or user id password set or voice recognition.

Figure 2:
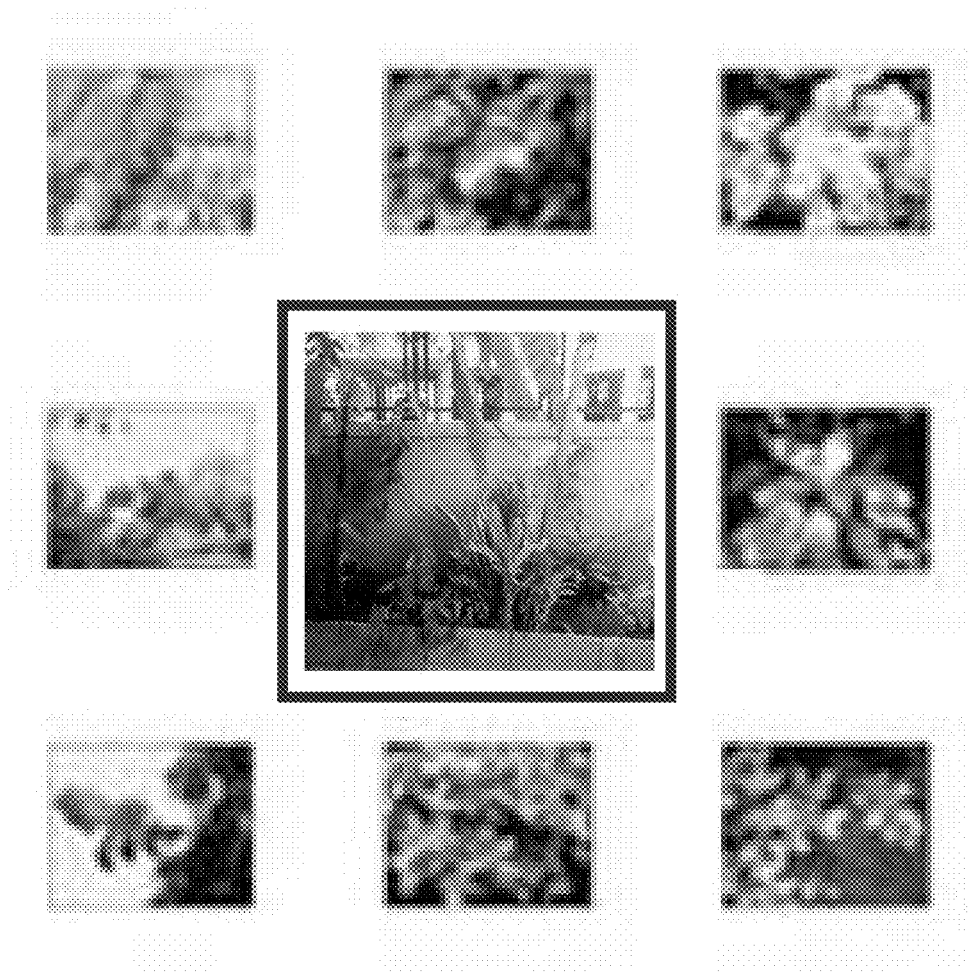
FIG. 2 illustrates a sample of first level authentication challenge, in accordance with the present invention.

In accordance with an exemplary embodiment of the present invention FIG. 2 illustrates a sample of first level authentication challenge where multiple images are shown in a grid pattern and correct password image is selected by the user, depicted by the enlarged image covered by the blue outlining box.

Figure 3:
FIG. 3 illustrates a sample of tiled image for the second level authentication challenge and first positions of yellow outlining frame in accordance with the present invention.
Figure 4:
FIG. 4 illustrates a sample tiled image for a second level authentication challenge and selected tile is shown by a yellow highlighted box, in accordance with the present invention.

In accordance with another exemplary embodiment of the present invention FIG. 3 and FIG. 4 illustrates a sample of second level authentication challenge where a tiled version of the image selected as password in the first level authentication challenge is displayed. A moving frame is depicted in yellow color which moves randomly across all the tiles and user is required to select the correct password tile as shown in FIG. 4 by the yellow highlighted box.

In accordance with still another aspect of the present invention the user is first trained before actual use of the system, in order to ensure that no fault occurs at the user end during the actual deployment of the system for that user. The user will be made to practice and memorize the visual passwords by selecting the image(s) and further selecting the tile(s) in a simulated environment on user's computing device 110 several times (preferably 10 times) so that he/she becomes aware of the actual system operation and problems which may be faced while the actual system operation can be eliminated at the training phase itself For this purposes of training the user's computing device 110 will be provided with an application which will run the simulation for certain pre-specified number of times. This application enables the user to practice the visual passwords and automatically gets deleted from the user's computing device 110 after the expiry of a pre-specified period.

Figure 5:
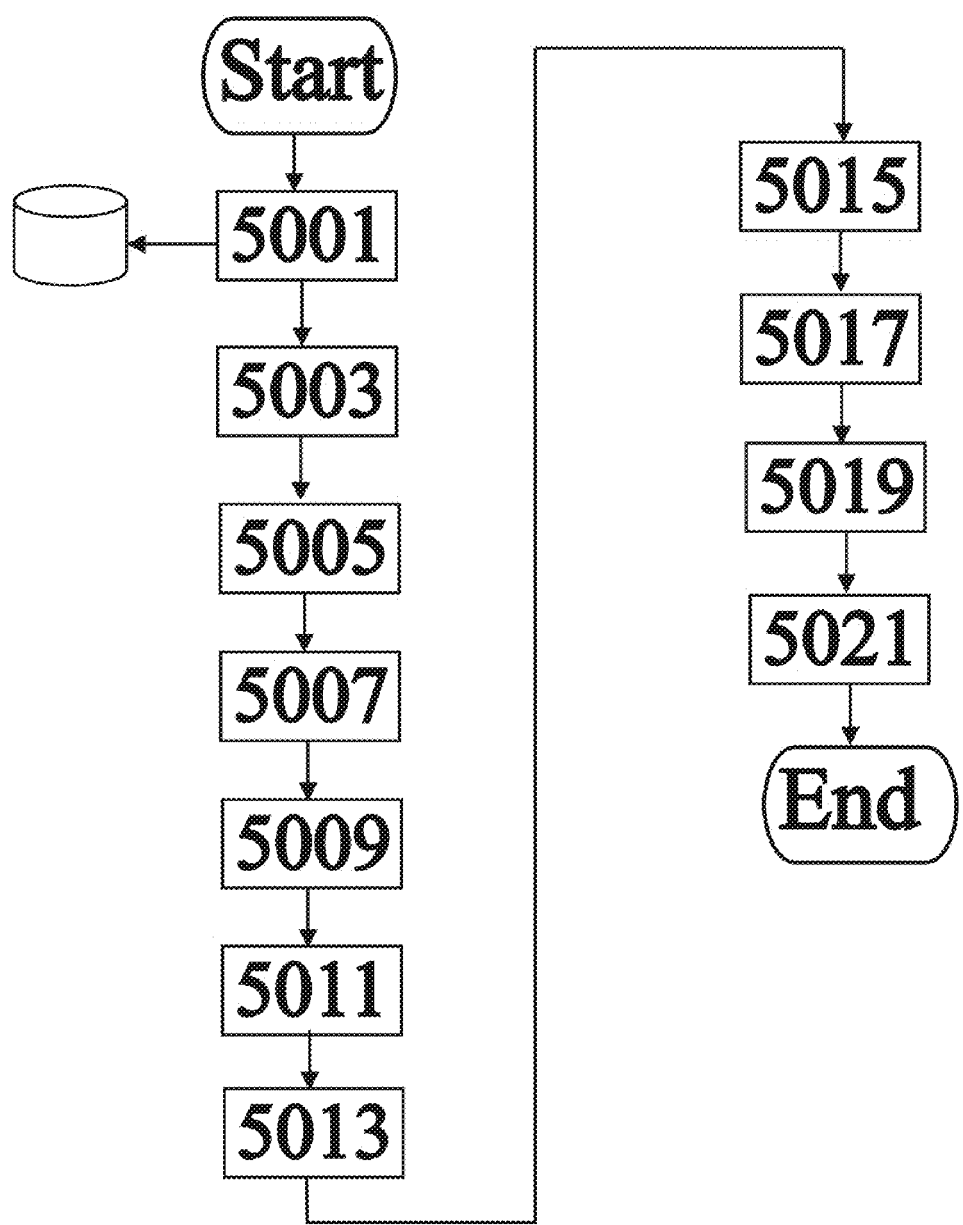
FIG. 5 illustrates a flowchart of the method for authentication, in accordance with the present invention.

In accordance with still another aspect of the present invention FIG. 5 shows a method for authenticating a user, the method performing three level authentication on the basis of selection of at least one predefined image from a plurality of images including decoy images and further selection of at least one predefined tile in the tiled version of the selected images to generate a transaction key, the method comprising the steps of storing user authentication data including at least one password image serving as correct response for a first level authentication challenge, tiled version of password image and at least one password tile serving as correct response for second level authentication challenge, 5001;

generating a first level authentication challenge for the user by formulating a group of images including a plurality of decoy images and the at least one password image to be displayed on user's computing node, 5003;

transmitting first level authentication challenge, at least one password image, tiled version of password image and at least one password tile on to a user's computing node, 5005;

receiving said first level authentication challenge, at least one password image, tiled version of password image and at least one password tile displaying the group of images contained in said received first level authentication challenge, 5007;

selecting at least one image from the plurality of images displayed on the computing node, 5009;

generating second level authentication challenge by displaying the tiled version of the password image containing a plurality of tiles in case the selected image is the password image, 5011;

providing an outlining frame randomly moving across each of the plurality of tiles after a finite delay, 5013;

selecting at least one tile currently outlined by said outlining frame from the plurality of tiles displayed on the computing node, 5017;

generating authenticating message in case the selected tile is the password tile and transmitting said authenticating message to a transaction key generating server, 5019; and transmitting a transaction key to the user's computing node on receiving an authenticating message, using said transaction key for final account login and grant of transaction rights, 5021.

In accordance with still another aspect of the present invention the method includes the step of challenging the user to enter correct alphanumeric username and password to continue authentication.

In accordance with still further an aspect of the present invention the step of storing user authentication data in the authentication repository is performed during user registration phase.

In accordance with still an additional aspect of the present invention step of selecting at least one image from the plurality of images displayed on the computing node includes the step of checking the sequence of selection of images, selected in the previous stage in case of multiple password images serving as correct response for first level authentication challenge.

In accordance with yet another aspect of the present invention step of generating authenticating message in case the selected tile is the password tile includes the step of checking the sequence of selection of tiles, selected in the previous stage in case of multiple password tiles serving as correct response for second level authentication challenge.

TECHNICAL ADVANTAGES

The technical advances of the present invention include in providing:
- an easily operable authentication system;
- an easily deployable authentication system;
- an efficient and reliable authentication system;
- a system for authentication which is able to provide multilevel security checks;
- a time effective system for authentication;
- a space effective system for authentication;
- a cost effective system for authentication;
- a system which enables authentication to be carried on users owned handheld device; and
- using customer owned handheld device's touch screen interface or designated keys.

While considerable emphasis has been placed herein on the components and component parts of the preferred embodiments, it will be appreciated that many embodiments can be made and that many changes can be made in the preferred embodiments without departing from the principles of the invention. These and other changes in the preferred embodiment as well as other embodiments of the invention will be apparent to those skilled in the art from the disclosure herein, whereby it is to be distinctly understood that the foregoing descriptive matter is to be interpreted merely as illustrative of the invention and not as a limitation.

The invention claimed is:

1. A system for authenticating a user, said system performing three level authentication on the basis of selection of at least one predefined image from a plurality of images including decoy images and further selection of at least one predefined tile in the tiled version of the selected images to generate a transaction key, said system comprising:
    an authentication server comprising
        an authentication repository storing user authentication data including at least one password image serving as correct response for a first level authentication challenge, tiled version of password image and at least one password tile serving as correct response for second level authentication challenge;
        first authentication challenge generation means adapted to generate a first level authentication challenge for the user by formulating a group of images including a plurality of decoy images and said at least one password image to be displayed on user's computing node;

transmitting means adapted to transmit said first level authentication challenge, at least one password image, tiled version of password image and at least one password tile on to a user's computing node;

user's computing node receiving said first level authentication challenge, at least one password image, tiled version of password image and at least one password tile, said user's computing node including displaying means adapted to display the group of images contained in said received first level authentication challenge;

first selection means adapted to allow the user to select at least one image from the plurality of images displayed on the computing node;

second authentication challenge generation means adapted to generate second level authentication challenge by displaying the tiled version of the password image containing a plurality of tiles in case the selected image is the password image;

frame locomotion means adapted to provide an outlining frame randomly moving across each of the plurality of tiles after a finite delay;

second selection means adapted to allow the user to select at least one tile currently outlined by said outlining frame from the plurality of tiles displayed on the computing node; and authenticating message generation means adapted to generate authenticating message in case the selected tile is the password tile;

a transaction key generating server cooperating with said user's computing node and configured to transmit a transaction key to said user's computer node on receiving an authenticating message from said authentication message generation means, said transaction key to be used for final account login and grant of transaction rights.

2. The system as claimed in claim 1, wherein said second authentication challenge generation means includes first sequence checking means adapted to check the sequence of selection of images, selected in the previous stage in case of multiple password images serving as correct response for first level authentication challenge.

3. The system as claimed in claim 1, wherein said authenticating message generation means includes second sequence checking means adapted to check the sequence of selection of tiles, selected in the previous stage in case of multiple password images serving as correct response for second level authentication challenge.

4. The system as claimed in claim 1, wherein said computing node is selected from the group consisting of mobile phone, PDA, iPOD, iPAD, computer, laptop, and TV.

5. The system as claimed in claim 1, wherein transaction key is entered on a second computing means.

6. The system as claimed in claim 1, wherein said transmitting means transmits said first level authentication challenge and tiled version of password image on to a user's computing node using connection selected from the group consisting of GSM connection, CDMA connection, internet, GPRS, Bluetooth, RFID and EDGE.

7. The system as claimed in claim 1, wherein said system includes conventional authentication means adapted to challenge user to enter correct alphanumeric username and password to continue authentication.

8. The system as claimed in claim 1, wherein said authentication repository is populated during user registration phase.

9. A method for authenticating a user, said method performing three level authentication on the basis of selection of at least one predefined image from a plurality of images including decoy images and further selection of at least one predefined tile in the tiled version of the selected images to generate a transaction key, said method comprising the steps of storing user authentication data including at least one password image serving as correct response for a first level authentication challenge, tiled version of password image and at least one password tile serving as correct response for second level authentication challenge;

generating a first level authentication challenge for the user by formulating a group of images including a plurality of decoy images and said at least one password image to be displayed on user's computing node;

transmitting first level authentication challenge, at least one password image, tiled version of password image and at least one password tile on to a user's computing node;

receiving said first level authentication challenge, at least one password image, tiled version of password image and at least one password tile displaying the group of images contained in said received first level authentication challenge;

selecting at least one image from the plurality of images displayed on the computing node;

generating second level authentication challenge by displaying the tiled version of the password image containing a plurality of tiles in case the selected image is the password image;

providing an outlining frame randomly moving across each of the plurality of tiles after a finite delay;

selecting at least one tile currently outlined by said outlining frame from the plurality of tiles displayed on the computing node;

generating authenticating message in case the selected tile is the password tile and transmitting said authenticating message to a transaction key generating server; and transmitting a transaction key to the user's computing node on receiving an authenticating message, using said transaction key for final account login and grant of transaction rights.

10. The method as claimed in claim 9, wherein said method includes the step of challenging the user to enter correct alphanumeric username and password to continue authentication.

11. The method as claimed in claim 9, wherein the step of storing user authentication data in the authentication repository is performed during user registration phase.

12. The method as claimed in claim 9, wherein the step of selecting at least one image from the plurality of images displayed on the computing node includes the step of checking the sequence of selection of images, selected in the previous stage in case of multiple password images serving as correct response for first level authentication challenge.

13. The method as claimed in claim 9, wherein the step of generating authenticating message in case the selected tile is the password tile includes the step of checking the sequence of selection of tiles, selected in the previous stage in case of multiple password tiles serving as correct response for second level authentication challenge.

* * * * *